(12) United States Patent
Herzog

(10) Patent No.: US 11,135,768 B2
(45) Date of Patent: *Oct. 5, 2021

(54) PRODUCTION SYSTEM FOR THE SIMULTANEOUS ADDITIVE MANUFACTURING OF SEVERAL COMPONENTS

(71) Applicant: Concept Laser GmbH, Lichtenfels (DE)

(72) Inventor: Frank Herzog, Lichtenfels (DE)

(73) Assignee: Concept Laser GmbH, Lichtenfels (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/908,812

(22) Filed: Jun. 23, 2020

(65) Prior Publication Data

US 2020/0331199 A1    Oct. 22, 2020

Related U.S. Application Data

(63) Continuation of application No. 15/526,727, filed as application No. PCT/EP2015/075829 on Nov. 5, 2015, now Pat. No. 10,723,070.

(30) Foreign Application Priority Data

Nov. 13, 2014    (DE) .......................... 102014016718.6

(51) Int. Cl.
*B29C 64/153*    (2017.01)
*B29C 64/386*    (2017.01)
(Continued)

(52) U.S. Cl.
CPC .......... *B29C 64/153* (2017.08); *B29C 64/386* (2017.08); *B33Y 10/00* (2014.12);
(Continued)

(58) Field of Classification Search
None
See application file for complete search history.

(56) References Cited

U.S. PATENT DOCUMENTS 6,824,714 B1    11/2004    Turck et al.
9,067,360 B2    6/2015    Wehning et al.
(Continued)

FOREIGN PATENT DOCUMENTS

CN    102239045 B    8/2015
CN    103400165 B    5/2016
(Continued)

OTHER PUBLICATIONS

Chinese Search Report Corresponding to Application No. 2015800615649.
(Continued)

*Primary Examiner* — Jacob T Minskey
*Assistant Examiner* — Caroline Montiel
(74) *Attorney, Agent, or Firm* — Dority & Manning, P.A.

(57) ABSTRACT

Methods of additively manufacturing components include providing a first control command and/or a second control command to a cart selected from among a plurality of carts. The first control command may be configured to cause the selected cart to autonomously drive or fly to a construction container selected from among a plurality of construction containers and to receive automatically the selected construction container, and, upon the selected cart receiving automatically the selected construction container, to autonomously drive or fly the selected cart to a construction apparatus selected from among a plurality of construction apparatuses. The second control command may be configured to cause the selected cart to autonomously drive or fly to the selected construction apparatus and to receive automatically a construction container containing a component
(Continued)

having been additively manufactured by the selected construction apparatus upon the selected construction apparatus automatically discharging the construction container containing the component.

20 Claims, 3 Drawing Sheets

(51) Int. Cl.
    *B33Y 10/00*     (2015.01)
    *B33Y 50/02*     (2015.01)
    *B28B 1/00*     (2006.01)
    *B33Y 80/00*     (2015.01)
    *B22F 10/40*     (2021.01)

(52) U.S. Cl.
    CPC ............... *B33Y 80/00* (2014.12); *B22F 10/40* (2021.01); *B28B 1/001* (2013.01); *B33Y 50/02* (2014.12)

(56) References Cited

U.S. PATENT DOCUMENTS

| | | |
|---|---|---|
| 2007/0074659 A1 | 4/2007 | Wahlstrom |
| 2007/0075458 A1 | 4/2007 | Wahlstrom et al. |
| 2008/0190905 A1 | 8/2008 | Heinlein |
| 2008/0262669 A1 | 10/2008 | Smid et al. |
| 2009/0139078 A1 | 6/2009 | Fruth et al. |
| 2010/0161102 A1 | 6/2010 | Mattes et al. |
| 2010/0192806 A1 | 8/2010 | Heugel et al. |
| 2012/0119399 A1 | 5/2012 | Fruth |
| 2013/0064707 A1 | 3/2013 | Matsui et al. |
| 2014/0065194 A1* | 3/2014 | Yoo ...................... B29C 64/165 424/400 |
| 2016/0243618 A1 | 8/2016 | Heugel et al. |

FOREIGN PATENT DOCUMENTS

| | | |
|---|---|---|
| DE | 19939616 A1 | 3/2001 |
| DE | 10342882 A1 | 5/2005 |
| DE | 102008060046 A1 | 6/2010 |
| DE | 102012003160 A1 | 9/2012 |
| DE | 102011119338 A1 | 5/2013 |
| EP | 2186625 A2 | 5/2010 |
| EP | 3068605 B1 | 2/2018 |
| JP | H0911088 A | 1/1997 |
| JP | 2005/235070 A | 9/2005 |
| JP | 2005/263112 A | 9/2005 |
| JP | 2007/098950 A | 4/2007 |
| JP | 2013/056466 A | 3/2013 |
| JP | 2013/134563 A | 7/2013 |
| JP | 2018/502365 A | 1/2018 |
| WO | WO 2004/014636 A1 | 2/2004 |
| WO | WO 2010/0112213 A2 | 10/2010 |
| WO | WO2011/131733 A2 | 10/2011 |

OTHER PUBLICATIONS

PCT International Search Report Corresponding to PCT/EP2015/075829 dated Jan. 28, 2016.
German Search Report Corresponding to Application No. 102014016718 dated Feb. 19, 2018.
Machine Translated Japanese Office Action Corresponding to Application No. 2017525925 dated Aug. 30, 2018.
Machine Translated Japanese Search Report Corresponding to Application No. 2017525925 dated Aug. 24, 2018.
Japanese Office Action Corresponding to Application No. 2017525925 dated Apr. 23, 2019.
European Search Report Corresponding to Application No. 20182183 dated Nov. 13, 2020.
Machine Translated Japanese Office Action Corresponding to Application No. 2019184346 dated Nov. 27, 2020.

* cited by examiner

PRODUCTION SYSTEM FOR THE SIMULTANEOUS ADDITIVE MANUFACTURING OF SEVERAL COMPONENTS

CROSS-REFERENCE TO RELATED APPLICATIONS

This application is a continuation of U.S. application Ser. No. 15/526,727, filed May 12, 2017, which is a national stage entry of International App. Serial No. PCT/EP2015/075829, filed Nov. 5, 2015, which claims the benefit of priority to German Patent App. No. 10 2014 016 718.6, filed Nov. 13, 2014, the contents of each such are incorporated herein by reference in their entirety as if set forth verbatim.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 1:
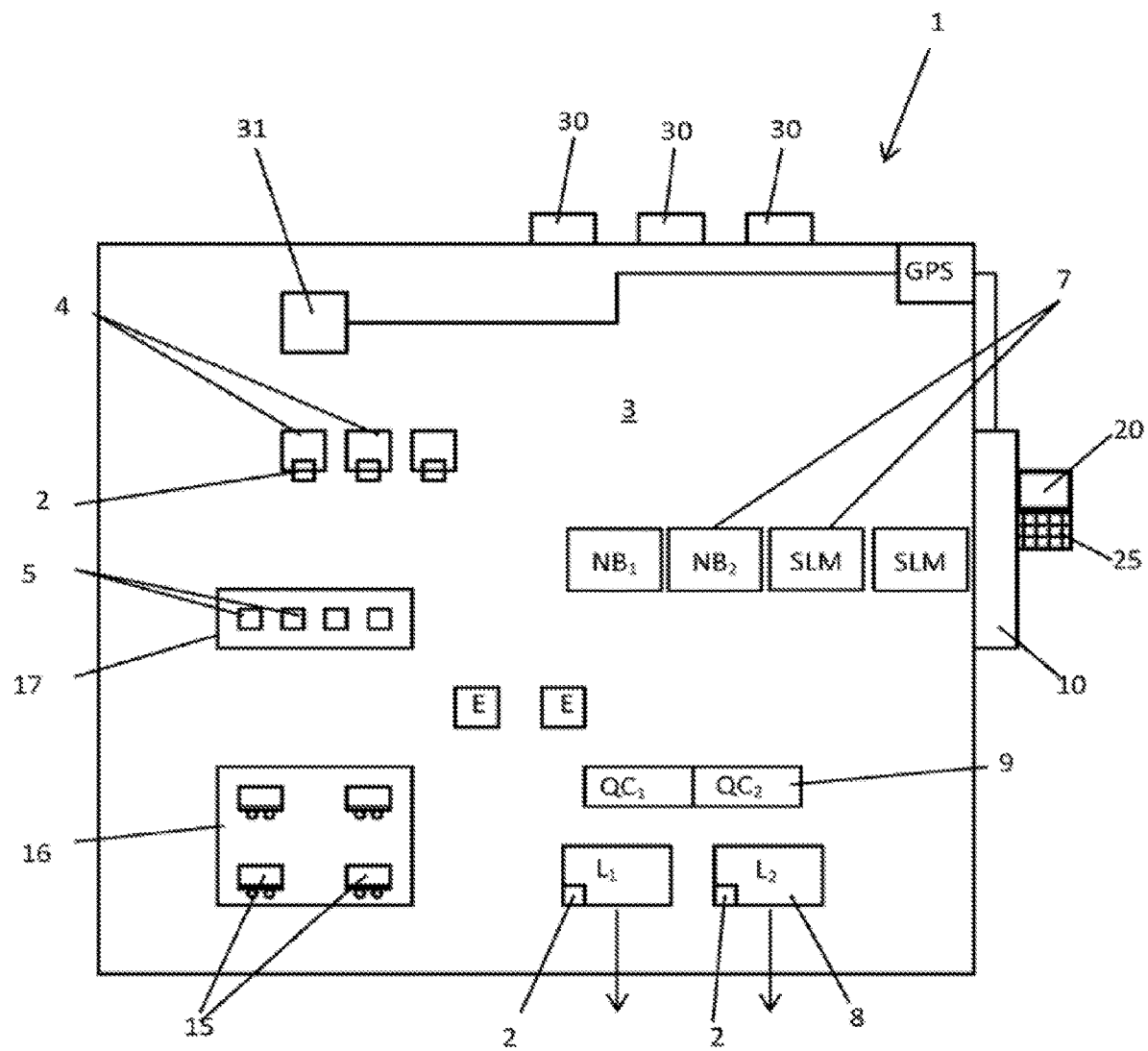
FIG. 1 schematically depicts a production processing section with a plurality of different apparatuses and devices.

Repeat use of reference characters in the present specification and drawings is intended to represent the same or analogous features or elements of the present disclosure.

DETAILED DESCRIPTION

The present disclosure relates to a production system with which several components can simultaneously and additively be manufactured using a selective laser sintering or a laser melting method. The manufacturing is done in a production system section in which at least two construction apparatuses in the form of laser sintering or laser melting apparatuses are provided. Such apparatuses are generally referred to as SLM or SLS apparatuses and generally comprise a construction container that can be removed from a process chamber of the apparatus.

In the construction container a height movable platform is arranged onto which a construction material that can be molten or sintered is applied using a coater. The construction material layer is sintered or molten and thus solidified layer by layer by a laser beam supplied by means of a scanner. On said partially solidified layer a next layer is applied and the laser sintering or laser melting process is repeated until the three-dimensional component is finished.

After completion, a removal of the finished or at least partially finished component from the construction container is done in a removal station. A removal station serves for removing the non-solidified construction material from the construction container and to discharge it according to instructions and the like. Then, the component can be passed onto a post-processing station for thermal or mechanical surface post-processing. Once the workpiece is finished, it is stored into a storage section for storing the components.

In general, all apparatuses mentioned operate self-sustaining, i.e. a component is finished in a construction apparatus, and then the container is removed by an operator. The component is extracted in a removal station manually or partly automated, the extracted component is then manually taken to a post-processing station by an operator, is installed there, the post-processing process is performed and then the component is taken into a storage area by an operator, where it is then prepared for shipping.

Each of the apparatuses mentioned generally has a separate electronic control; an employee working in a production treatment section is forced to inquire after completion of a manufacturing or removal step which of the further apparatuses in the production treatment section is free for further treatment steps, which apparatus comprises sufficient construction material to start a new construction process, which storage section is suited to receive a component and the like.

It is an object of the present disclosure to design a production system having the features of the preamble of claim 1 such that in it the individual manufacturing, extracting, assembly, post-processing and transport steps can proceed more or less fully-automatically, that the single apparatuses to be provided in the production system can be designed in a simplified way and the entire production process with the individual steps mentioned can be performed more quickly.

In some embodiments, a production system control device is provided that interacts with the construction apparatuses, the at least one removal station, the at least one post-processing station and the like, and which is formed for controlling the apparatus as well as for requesting the operating status and the temporal availability of the apparatuses as well as for requesting the amounts of construction material available in the apparatuses.

This firstly means that the system control device is suited to interact with the construction apparatuses. All construction apparatuses can be supervised by this system control device virtually as if from a production control room by only one operator. The construction apparatuses themselves, i.e. the laser sintering or laser melting systems, do not need to be provided with input apparatuses or displays; they can thus be manufactured in a more simple and more cost-efficient way.

Furthermore, a control by the operator on how much construction material is still present in a system is omitted. A system that does not include sufficient construction material for the next construction process can e.g. be filled via an automatic refill device that can also be performed by the production system control device. The operator working on the production system control device can see at a glance on a display which construction apparatus is available, how much construction material it contains, and which construction material it is. The operator gets feedback from the apparatus, whether the construction material is sufficient for the next construction process, which can also be inputted and started at the "control room".

Another significant feature of the system is to automatically receive the construction containers removable from the construction apparatuses by self-driven transport means that can be directed and controlled by the production system control apparatus, to transport them to an apparatus or a station of the system and to insert them e.g. into a process chamber, to automatically lock or after completing a construction process to also unlock again, to receive and to take them to another station e.g. an intermediate storage station or a removal station and to insert therein. The transport means according to the present disclosure are either self-driven transport carts driving at the bottom that can be controlled in any way, or are formed as transport aerial devices, wherein the aerial devices can e.g. be quadcopters or optocopters, i.e. helicopter-like devices that today are also referred to as "drones" and that are suited for receiving appropriate loads.

Such aerial devices today have proved themselves in numerous fields of application and are capable of receiving relatively high loads and precisely take them to a destination point and set them down there.

In other words, not only a supervision of the construction apparatuses is performed, but also the assembly thereof with construction containers, components, construction plates or construction material, the removal of the construction containers after a construction process, taking the construction container to an extraction station or a storage area and the like. All of this can also be centrally controlled from the production control room.

It is possible that only one operator can e.g. determine which construction container is to be taken to which construction apparatus, which material is to be consumed in the construction container, to which removal station the construction container containing the finished component is to be driven or flown, whether said component can be extracted together with the construction material in an inert gas atmosphere and the like. All these production steps can centrally be performed via the production system control device.

Therefore, the production system control device has an input apparatus and at least one display. This allows control data for the entirety of the production system, i.e. for the construction apparatuses, the removal station, post-processing stations and the like, to be inputted, starting from the construction material and construction data to customer information and the shipping destination, which can be the crucial factor for the storage area to which the finished component is taken.

It is especially advantageous if each self-driven transport means has an electronic coding that can be read by the SLM or SLS apparatus, the removal station. the post-processing station and the production system control apparatus. This way a control is enabled that lets an operator gain clear knowledge of where an individual component of the entire production system is at what point in time. All of this can be shown on a display and can be recorded in a storage to be able to track and later relate to the entire production process in a transparent manner, which is significant or at least advantageous for quality assurance of the often expensive and sensitive components.

The production system control apparatus can be provided with a receiving device by which workpiece-specific data sent out from the construction containers can be read.

Said data can e.g. be read into a storage of the construction container during the construction process and can be retrieved from there at any one time.

As for the self-driven transport carts that can be controlled without rails, such transport carts are prior art and can e.g. be controlled via an indoor GPS system, wherein this control is also performed via the production system control apparatus. The same applies to the transport aerial devices.

Advantageously, the entire production system comprises a plurality of such self-driven transport means. At least one portion of said transport means is provided with receiving and storage apparatuses for extracted components, furthermore, robot arms and the like for handling said components or construction plates to be inserted in containers can be provided on or at the transport means to remove the components or construction plates from the construction containers or insert them into said containers, to rotate them, to turn them around and to put them e.g. on a respective adjustment stand in a post-processing station.

The transport means can also have drives for the height adjustment of carrying plates that are height adjustably arranged on or at construction containers arranged on them, to e.g. in the section of a removal station lift a finished component and non-solidified construction material out of a construction container and to further convey it.

In some embodiments, not only the availability of system components for further production steps or the filling level of metering tanks and reservoirs of construction material is requested, but the production system control apparatus is also capable to e.g. control the construction plate handling and adjustment devices by which construction plates can fully-automatically be placed and fixed on height adjustable carriers of construction containers and can be adjusted into a desired position. The adjustment data of said apparatuses can also be stored in a storage of the production system control device. According to the present disclosure, the production system control apparatus also considers a production schedule by which e.g. a timely completion and/or delivery of an ordered component are specified.

Referring to FIG. 1 production system 1 is provided for simultaneous and additive manufacturing of components 2 and has a production processing section 3 in which at least two SLS and/or SLM apparatuses 4 are provided, each of which has a construction container 5 that can be removed from a process chamber of the apparatuses 4. Furthermore, at least one removal station 6 is provided in the production processing section 3, in which a finished component 2 can be removed from a construction container 5. Furthermore, in the production system section 3 at least one post-processing station 7 for thermal and/or mechanical surface post-treatment of finished removed components is provided, and a storage section 8 into which the components 2 for delivery can be taken and can be intermediately stored.

All system components of the production system section 3 are connected to a production system control apparatus 10 formed for controlling the respective apparatuses and stations 4, 6, 7 as well as for requesting the operating status and the temporal availability of the apparatuses, or for requesting the amounts and the type of construction material available in the apparatuses. For the SLS or SLM apparatuses 4 this means that it is requested whether there is sufficient construction material available to perform the next construction task. For the removal stations 6 this means, however, that it is requested whether there is still sufficient space for powder to be suctioned in the powder containers, in order to be able to perform a removal process according to instructions and without contamination of the surrounding section with construction material.

Also, at least one quality assurance device 9 can be connected to the production system control apparatus 10; such assurance apparatuses may e.g. include in electronically scanning the outer shape of a component, determining the density thereof, measuring the weight thereof and the like, wherein the quality of the components can be evaluated in many different ways.

The construction containers 5 are automatically received in the production system section 3 by self-driven transport means 15 that can be guided by the production system control apparatus 10, are transported to an apparatus, station or device 4, 6, 7, 8, 9 and are there e.g. inserted into a system component, such as the process chamber, and are automatically locked.

Figure 2:
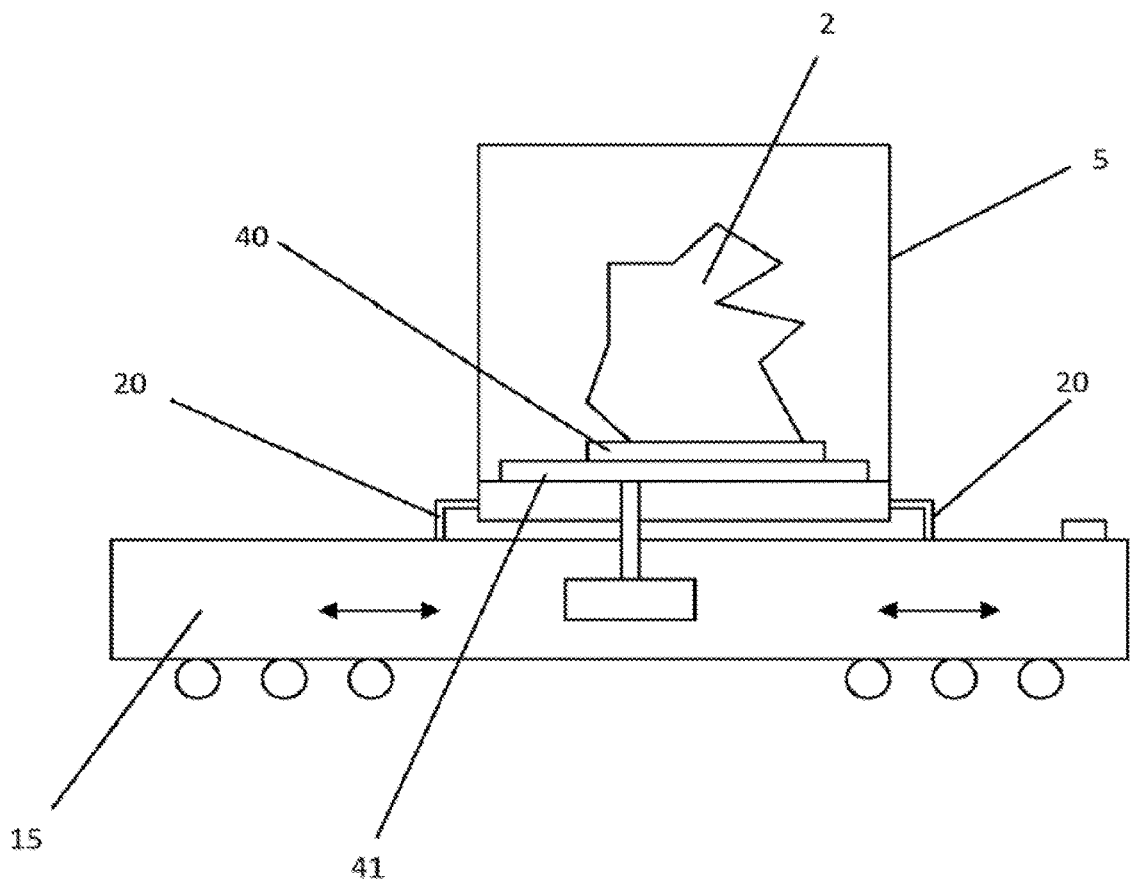
FIG. 2 schematically depicts a transport cart with a construction container attached to it, which can be directed by the production system control apparatus.

After completion of an additive construction process in an SLS or SLM apparatus 4 the construction containers 5 are automatically received by a self-driven transport means 15 by automatically unlocking and are moved to an intermediate storage station or a removal station 6 in a program-controlled manner and are inserted therein. The construction containers 5 are fixed on the transport means 15 via at least one coupling apparatus 20 (see FIG. 2) attached to the containers, and can e.g. be brought into engagement with locking elements of an SLM or SLS apparatus 4, wherein the coupling apparatus 20 between transport means 15 and construction container 5 is unlocked in a program-controlled manner.

The production system control apparatus 10 comprises at least one input apparatus 25 and a display 26, thus it is formed like a control room for the production system section 3.

In some embodiments, each self-driven transport means 15 has an electronic coding that can be read by the SLM or SLS apparatuses 4, the removal station 6, the post-processing station 7 or the production system control apparatus 10, wherein the production system control apparatus 10 is provided with a receiving device by which workpiece specific data sent out from the construction containers 5 can be read. In an advantageous manner, this results into the fact that at any time it can be monitored on which transport means 15, which construction container 5 and thus which component 2 is transported, via the production system control apparatus 10. The production system control device 10 is thus capable of controlling the self-driven transport means 15 for transporting the construction containers 5 depending on the workpiece data. This ensures that a construction container 5 e.g. for thermal post-treatment is transferred into a heat treatment apparatus, a respective heat treatment step is performed there and then the component 2 thus "tempered" is taken to an intermediate storage area or to a storage section 8.

The system comprises a plurality of self-driven transport carts 15 that can be parked on call in a transport cart parking area 16. According to the present disclosure, the transport means 15 parking there are to be provided with construction containers 5 already saddled to be able to quickly take a transport means 15 with a construction container 5 to am SLM or SLS apparatus 4, as needed. Furthermore, according to the present disclosure it is also possible to provide a construction container reservoir 17 in which a plurality of equal or different construction containers 5 can be stored.

By centrally controlling the system components via the production system control apparatus 10 the individual apparatuses, especially the SLM or SLS apparatuses 4, can be formed in a simplified way, i.e. without separate input and display apparatuses, significantly reducing the manufacturing costs thereof.

The production system control apparatus 10 comprises an availability check device for the apparatuses contained in the production system 1. The self-driven transport means 15 and the construction containers 5 carried by them are controlled depending on an availability check of the apparatuses, stations and devices 4, 6, 7, 8, 9 contained in the production system 1. The filling level of metering tanks and reservoirs with construction material is monitored via the production system control apparatus 10 and formed for dispensing a refill control signal for refill devices connected with the apparatuses. The refill devices comprise reservoirs 30 with different types of construction material and a powder transport apparatus 31 that drives from the reservoirs 30 to the SLS or SLM apparatuses 4 disposing construction material. Similarly, it is imaginable to provide powder transport from the removal stations 6 to a powder disposal or cleaning/sifting system that is not shown in detail.

Furthermore, the production system control apparatus 10 is connected with a construction plate handling or adjusting device by means of which construction plates can fully-automatically be placed and fixed on height adjustable carriers of the construction containers 5 and can be adjusted into a desired position. The handling of the construction plates 40, one of which is shown on a height adjustable carrier 41 of a construction container 5, can be done by robot arms or the like, the production system 1 can comprise a storage section for different construction plates 40 that can be received by transport means 15 with a robot arm and can be inserted in a container and can there be automatically adjusted. Automatic adjustment can be performed either optically or mechanically by sensors. The data of different construction plates are also stored in the production system control device 10.

Furthermore, for quality assurance thermal data regarding the melting process can be stored and shown in each SLM or SLS apparatus.

In addition, it is imaginable that in case of construction materials critical to explosion the production system control device 10 is formed and programmed such that it comprises an inerting and/or a flooding of powder suction devices or removal stations 6 according to instructions.

Figure 3:
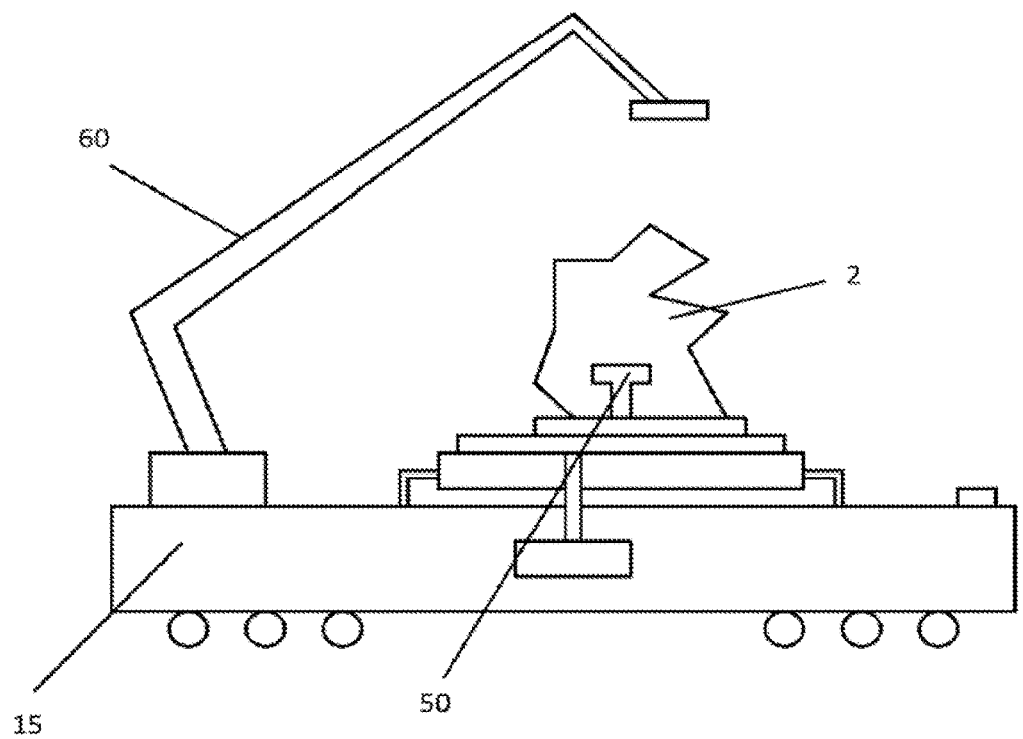
FIG. 3 schematically depicts a transport cart that can be directed by the production system control apparatus, with a component attached to it on a fastening device as well as a robot arm that can be operated by remote control, arranged on the transport cart.

In FIG. 3 of the drawings, a transport cart 15a is shown on which a centering apparatus 50 is arranged on which a component 2 already extracted can be hold in a defined desired position. The transport cart 15a can thus move into a post-processing section to e.g. perform a surface post-processing of the component 2. A robot arm 60 is suited to remove a component from a construction container 5 and to put it on top of the centering apparatus 50 or to release it again from it and to put it e.g. down in a storage section 8.

Figure 4:
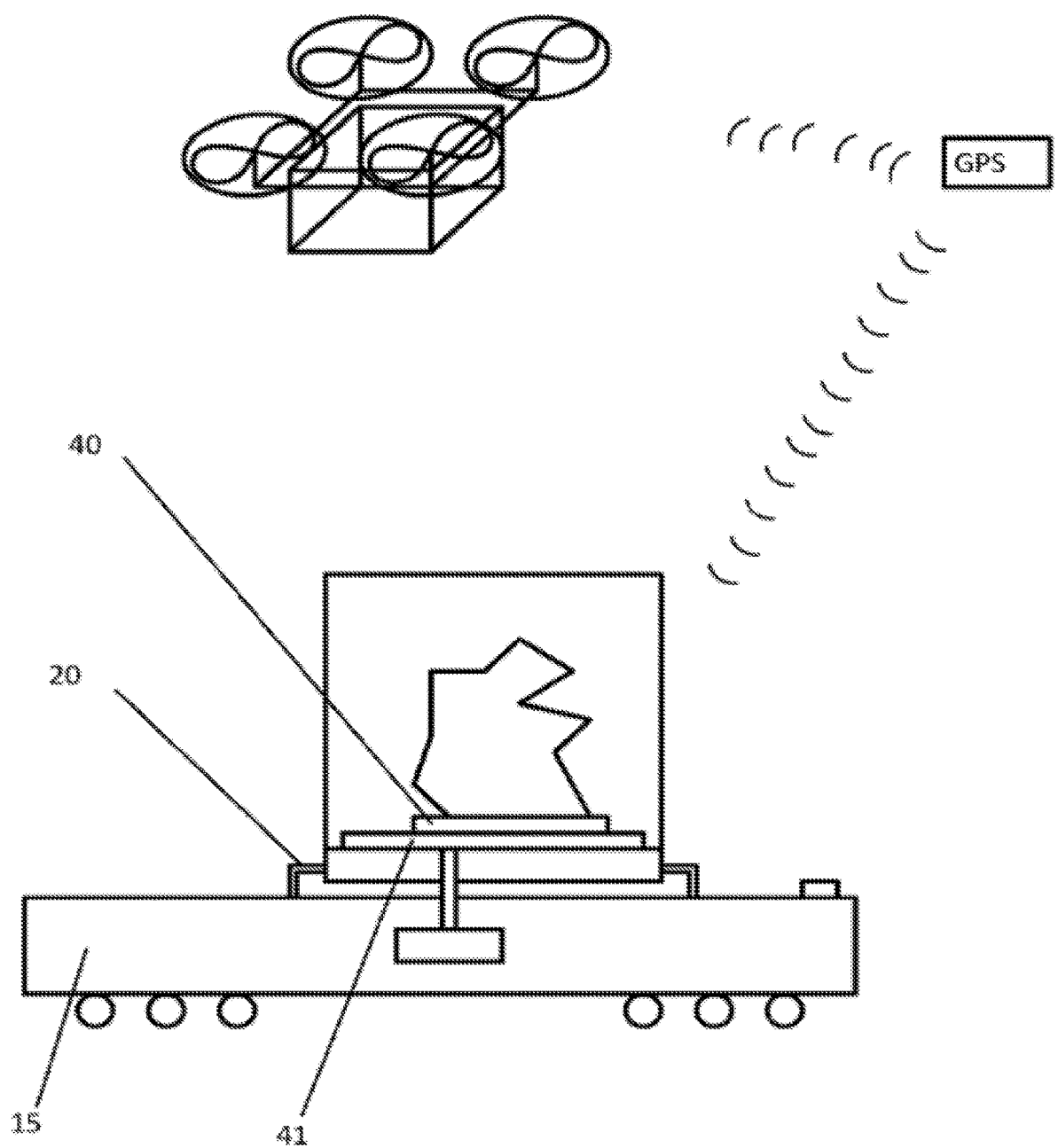
FIG. 4 schematically depicts a transport cart and a transport aerial device with a construction container coupled thereto.

In FIG. 4 of the drawings, in addition to a transport cart 15a, a transport aerial device 15b is schematically shown to which a construction container 5 is coupled. The construction container 5 is held by a coupling apparatus on the bottom side of the transport aerial device 15b. In the present case, the transport aerial device 15b is shown as a quadcopter and can be controlled by the indoor GPS as well as the transport carts 15a.

LIST OF REFERENCE NUMBERS

1 Production system
2 Component
3 Production system section
4 SLM/SLS apparatus
5 Construction container
6 Removal station
7 Post-processing station
8 Storage section
9 Quality assurance device
10 Production system control apparatus
15 Transport means
15a Transport cart
15b Transport aerial device
16 Transport cart parking area
17 Construction container reservoir
20 Coupling apparatus
25 Input apparatus 26 Display
30 Reservoir
31 Powder transport apparatus
40 Construction plates
41 Carrier
50 Centering apparatus
60 Robot arm

The invention claimed is:

1. A method of additively manufacturing components, the method comprising:
providing a first control command to a cart selected from among a plurality of carts, the first control command configured to cause the selected cart to autonomously drive or fly to a construction container selected from among a plurality of construction containers and to receive automatically the selected construction container, and, upon the selected cart receiving automatically the selected construction container, to autonomously drive or fly the selected cart to a construction apparatus selected from among a plurality of construction apparatuses; and
providing a second control command to a cart selected from among a plurality of carts, the second control command configured to cause the selected cart to autonomously drive or fly to the selected construction apparatus and to receive automatically a construction container containing a component having been additively manufactured by the selected construction apparatus upon the selected construction apparatus automatically discharging the construction container containing the component.

2. The method of claim 1, wherein the first control command is provided to a first cart selected from among the plurality of carts and wherein the second control command is provided to a second cart selected from among the plurality of carts; or
wherein the first control command is provided to the first cart and wherein the second control command is provided to the first cart.

3. The method of claim 1, comprising:
selecting a construction container from among the plurality of construction containers based at least in part on temporal availability having been determined for one or more of the plurality of construction containers; and/or
selecting a cart from among the plurality of carts based at least in part on temporal availability having been determined for one or more of the plurality of carts; and/or
selecting a construction apparatus from among the plurality of construction apparatuses based at least in part on temporal availability having been determined for one or more of the plurality of construction apparatuses.

4. The method of claim 1, comprising:
determining the temporal availability of one or more of the plurality of construction containers and/or one or more of the plurality of carts and/or one or more of the plurality of construction apparatuses.

5. The method of claim 1, comprising:
providing a control command to the cart having received the component-containing construction container, the control command configured to cause the cart having received the component-containing construction container to autonomously drive or fly to a removal station selected from at least one removal station respectively configured to extract the component from non-solidified construction material in the component-containing construction container; and/or
providing a control command to a cart selected from among the plurality of carts, the control command configured to cause the selected cart to autonomously drive or fly the component, after having been extracted from the non-solidified construction material, to a post-processing station selected from at least one post-processing station configured for thermal and/or mechanical surface post-treatment of the component having been extracted from the non-solidified construction material.

6. The method of claim 1, comprising:
determining the temporal availability of one or more of a plurality of removal stations and selecting a removal station from among the plurality of removal stations based at least in part on the temporal availability of one or more of the plurality of removal stations.

7. The method of claim 1, comprising:
determining the temporal availability of one or more of a plurality of post-processing stations and selecting a post-processing station from among the plurality of post-processing stations based at least in part on the temporal availability of one or more of the plurality of post-processing stations.

8. The method of claim 1, comprising:
providing a control command to a cart selected from among the plurality of carts, the control command configured to cause the selected cart to autonomously drive or fly the component, after having received a thermal and/or mechanical surface post-treatment, to a storage section selected from at least one storage section configured for storing the component after having received the thermal and/or mechanical surface post-treatment.

9. The method of claim 1, comprising:
selecting a construction apparatus from among the plurality of construction apparatuses based at least in part on the amount of construction material available in one or more of the plurality of construction apparatuses and/or the type of construction material available in one or more of the plurality of construction apparatuses.

10. The method of claim 1, comprising:
receiving automatically, at respective ones of the plurality of construction containers, a construction plate from a construction plate handling device, the construction plate selected from among a plurality of construction plates, wherein respective ones of the plurality of construction containers comprise a height adjustable carrier configured to be automatically locked with a respective one of a plurality of construction plates.

11. The method of claim 1, wherein respective ones of the plurality of construction containers are configured to be automatically locked onto a respective one of the plurality of carts and/or into a process chamber of a respective one of the plurality of construction apparatuses.

12. The method of claim 11, wherein a respective one of the plurality of construction containers comprises at least one coupling apparatus, and wherein respective ones of the plurality of construction containers and/or respective ones of the plurality of carts comprise at least one locking element configured to engage with the at least one coupling apparatus.

13. The method of claim 1, wherein the plurality of construction apparatuses respectively comprise a selective laser sintering apparatus or a laser melting apparatus.

14. The method of claim 1, wherein respective ones of the plurality of carts comprise an electronic coding that can be read by a respective one of the plurality of construction apparatuses and/or by a production system control unit.

15. The method of claim 1, comprising:
selecting a cart from among the plurality of carts and/or providing a control command to a cart selected from among the plurality of carts, based at least in part on workpiece-specific data determined for a construction container selected from among the plurality of construction containers and having been associated with a workpiece.

16. The method of claim 15, comprising:
providing a control command to a cart selected from among the plurality of carts, the control command configured to cause the cart to automatically receive a refilling device selected from among one or more refilling device and to autonomously drive or fly the selected refilling device to a construction apparatus, the construction apparatus having been selected for refilling of construction material and the selected refilling device having been supplied with construction material from a reservoir selected from among one or more reservoirs configured to supply construction material to the one or more refilling devices.

17. The method of claim 1, comprising:
an indoor GPS system, wherein respective ones of the plurality of carts autonomously drive or fly to the one or more destinations of the production system based at least in part on information from the indoor GPS system.

18. The method of claim 1, comprising:
providing a control command to a cart selected from among the plurality of carts, the control command configured to cause the cart to automatically receive a powder suction device selected from among one or more powder suction devices and to autonomously drive or fly the selected powder suction device to a construction apparatus, the construction apparatus having been selected for refilling of construction material and the selected powder suction device having removed non-solidified construction material from the component-containing construction container.

19. A production system for additively manufacturing three-dimensional components, the production system comprising:
a production system control unit;
a plurality of carts;
a plurality of construction containers; and
a plurality of construction apparatuses;
wherein the production system control unit is configured to:
provide a first control command to a cart selected from among the plurality of carts, the first control command configured to cause the selected cart to autonomously drive or fly to a construction container selected from among the plurality of construction containers and to receive automatically the selected construction container, and, upon the selected cart receiving automatically the selected construction container, to autonomously drive or fly the selected cart to a construction apparatus selected from among the plurality of construction apparatus; and
provide a second control command to a cart selected from among the plurality of carts, the second control command configured to cause the selected cart to autonomously drive or fly to the selected construction apparatus and to receive automatically a construction container containing a component having been additively manufactured by the selected construction apparatus upon the selected construction apparatus automatically discharging the construction container containing the component.

20. A non-transitory computer-readable medium comprising computer-executable instructions, which when executed by a production system control unit, cause the production system control unit to perform a method comprising:
providing a first control command to a cart selected from among a plurality of carts, the first control command configured to cause the selected cart to autonomously drive or fly to a construction container selected from among a plurality of construction containers and to receive automatically the selected construction container, and, upon the selected cart receiving automatically the selected construction container, to autonomously drive or fly the selected cart to a construction apparatus selected from among a plurality of construction apparatus; and
providing a second control command to a cart selected from among a plurality of carts, the second control command configured to cause the selected cart to autonomously drive or fly to the selected construction apparatus and to receive automatically a construction container containing a component having been additively manufactured by the selected construction apparatus upon the selected construction apparatus automatically discharging the construction container containing the component.

\* \* \* \* \*